No. 711,362. Patented Oct. 14, 1902.
F. STEWART.
EYEGLASSES.
(Application filed Sept. 27, 1901.)

(No Model.)

Witnesses
Wm A Hirsl
Edward Haat

Inventor
Frank Stewart
By Clarence E Malehope
Attorney

THE NORRIS PETERS CO., PHOTO-LITHO., WASHINGTON, D. C.

UNITED STATES PATENT OFFICE.

FRANK STEWART, OF CINCINNATI, OHIO, ASSIGNOR OF ONE-HALF TO MARY E. NORRIS, OF CINCINNATI, OHIO.

EYEGLASSES.

SPECIFICATION forming part of Letters Patent No. 711,362, dated October 14, 1902.

Application filed September 27, 1901. Serial No. 76,745. (No model.)

*To all whom it may concern:*

Be it known that I, FRANK STEWART, a citizen of the United States, and a resident of Cincinnati, in the county of Hamilton and State of Ohio, have invented a certain new and useful Improvement in Eyeglasses, of which the following is a full, clear, and exact description, reference being had to the accompanying drawings, forming part of this specification.

My invention relates to the manner of securing the nose-pieces and spring to the studs carrying the glasses, and is adapted to overcome the various difficulties encountered by the wearer of eyeglasses in the adjustment of the spring due to the strain and wear on the screws by which the nose-pieces and spring are secured to the studs. Its advantages will appear more fully as I proceed with my specification.

Figure 1:
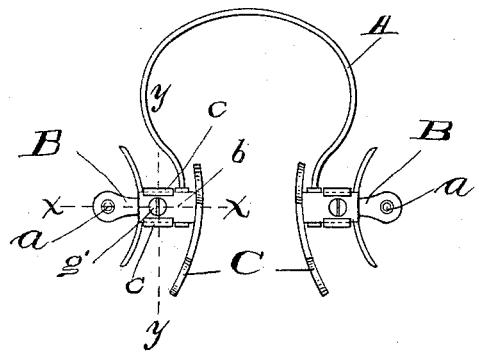
Figure 2:
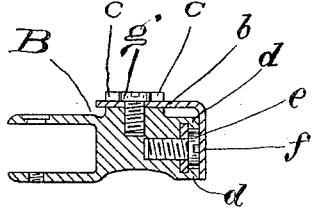
Figure 3:
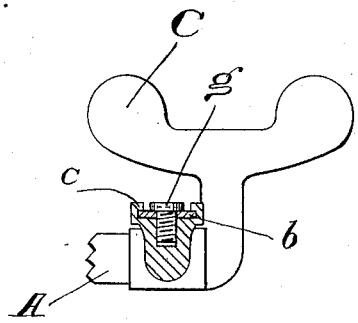
Figure 4:
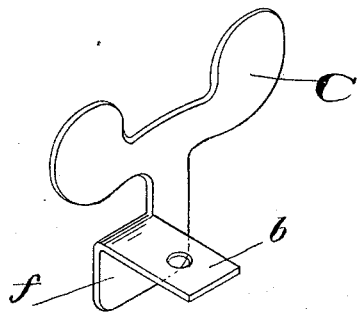

In the drawings which form a part of my specification, Figure 1 is an elevation of my improved nose-piece for eyeglasses. Fig. 2 is a cross-section taken on the line X X of Fig. 1. Fig. 3 is a vertical section taken on line $y$ $y$ of Fig. 1. Fig. 4 is a detail view of the nose-piece to more clearly illustrate its construction.

In eyeglasses as heretofore constructed the spring and nose-piece are secured to the stud of the eyeglass by one and the same screw, which is so located that its head comes into contact with the nose of the wearer, much to his discomfort. Furthermore, in applying the glasses to the nose the wearer spreads or springs them onto his nose, and in so doing puts considerable strain on the screws which fasten the spring and nose-pieces to the studs. It has been found in practice that on account of this strain the screws are constantly becoming loose and the threads worn or stripped, so that it is necessary to often readjust or replace them. Sometimes the screws are lost before the wearer notices their condition, and the glasses drop and are broken. This wearing loose of the screws is a constant annoyance to the wearer, and my invention is intended to overcome these difficulties.

Like letters of reference indicate identical parts in the drawings.

A is the usual spring, and B B are the studs, to which are also secured the lenses in the usual manner by means of screws or rivets which pass through the openings $a$.

C C are nose-pieces so shaped that they will properly set upon the nose. I also provide the nose-pieces with a portion $b$, extending at an angle to the body of the nose-pieces, as illustrated in Figs. 1 and 2, and it is through this portion that the screw passes which secures the nose-piece to the stud. I prefer to provide the forward side of the stud with a groove or slideway, which receives the portion $b$ of the nose-piece and is adapted to take considerable strain off the screw attaching said portion $b$ to the stud. Should the screw become loose or be lost, the nose-piece will still be retained in place by the overlapping portion $c$, which forms the slideway on the stud. The inner end of the stud is provided with a similar groove or slideway formed by the overlapping portions $d$ $d$, (see Figs. 2 and 3,) in which the spring A is secured by the screw $e$. When the screw is thoroughly screwed into place, the head will be within the groove, and the nose-piece C is also provided with a portion $f$, which extends over the screw $e$ and covers it, thus providing a smooth surface to come into contact with the nose of the wearer and also preventing said screw from becoming loose.

It is apparent that by the use of my construction there are no screws to come into contact with the skin of the wearer, and thus cause irritation. Besides, as separate screws are used for attaching the spring and nose-pieces to the stud the wear on the screws is diminished. Of course the portion $b$ may be attached to the rear of the stud instead of to the front, as shown in the drawings, without departing from the spirit of my invention.

I have described the studs as provided with slideways or grooves, within which the ends of the spring and also the portions $b$ of the nose-pieces fit; but it will be apparent that the studs may be constructed without these slideways or grooves and the nose-pieces and the spring be simply held in place by the respective screws, and I do not wish to limit myself to the exact construction illustrated; but

What I claim, and desire to secure by Letters Patent, is—

1. In eyeglasses, the combination of studs provided with grooves in planes at an angle to each other, a spring with its ends located in one of said grooves in each stud, nose-pieces provided with extensions, one of which is at an angle to the plane of the nose-piece and located in the second groove and the other resting above and covering the first groove, and means for securing the parts together, substantially as and for the purpose described.

2. In eyeglasses, the combination of studs provided with faces at an angle to each other, a spring with its ends secured to one face in each stud, nose-pieces provided with extensions, one of which is at an angle to the plane of the nose-piece and secured to the second face of the stud and the other resting above the first face, and means for securing the parts together, substantially as and for the purpose described.

3. In eyeglasses, the combination of studs provided with grooves in planes at an angle to each other, a spring with its ends located in one of said grooves in each stud, nose-pieces comprising a part to fit against the nose, an extension covering the groove in which the spring is located and an angular extension located in the other groove in the stud, and means for securing the parts together, substantially as and for the purpose described.

4. In eyeglasses, the combination of the studs B, B, provided with grooves at an angle to each other formed by the overlapping portions $d, d,$ and $c, c,$ respectively, the spring A, having its ends located in the grooves formed by the overlapping portions $d, d,$ the nose-pieces C, C, having the extensions $b, b,$ located in the grooves formed by the overlapping portions $c, c,$ and extensions $f,$ located above the overlapping portions $d, d,$ together with means for securing the parts together, substantially as and for the purpose described.

FRANK STEWART.

Witnesses:
GEORGE HEIDMAN,
EDWARD HAAT.